United States Patent
Goss et al.

(10) Patent No.: US 9,122,593 B2
(45) Date of Patent: Sep. 1, 2015

(54) RESTORING VIRTUALIZED GCU STATE INFORMATION

(71) Applicant: Seagate Technology LLC, Cupertino, CA (US)

(72) Inventors: Ryan James Goss, Prior Lake, MN (US); David Scott Seekins, Shakopee, MN (US); Mark Allen Gaertner, Vadnais Heights, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 14/599,725

(22) Filed: Jan. 19, 2015

(65) Prior Publication Data
US 2015/0143039 A1    May 21, 2015

Related U.S. Application Data

(63) Continuation of application No. 13/658,673, filed on Oct. 23, 2012, now Pat. No. 8,938,597.

(51) Int. Cl.
*G06F 12/00* (2006.01)
*G06F 12/02* (2006.01)

(52) U.S. Cl.
CPC ........ *G06F 12/0261* (2013.01); *G06F 12/0246* (2013.01); *G06F 2212/702* (2013.01); *G06F 2212/7205* (2013.01)

(58) Field of Classification Search
CPC ... G06F 3/0608; G06F 3/0653; G06F 3/0679; G06F 12/0261
See application file for complete search history.

(56) References Cited

U.S. PATENT DOCUMENTS

| | | |
|---|---|---|
| 7,181,565 B2 | 2/2007 | Sunco et al. |
| 8,077,520 B1 | 12/2011 | Yang et al. |
| 2008/0162079 A1 | 7/2008 | Astigarraga et al. |
| 2008/0282023 A1 | 11/2008 | Biswas et al. |
| 2012/0072639 A1 | 3/2012 | Goss et al. |

*Primary Examiner* — Gurtej Bansal
(74) *Attorney, Agent, or Firm* — Hall Estill Attorneys at Law (57) ABSTRACT

Method and apparatus for managing a memory, such as but not limited to a flash memory. In accordance with some embodiments, initial state information is stored which identifies an actual state of a garbage collection unit (GCU) of a memory during a normal operational mode. During a restoration mode after a memory power cycle event, a virtualized state of the GCU is determined responsive to the initial state information and to data read from the GCU. The memory is transitioned from the restoration mode to the normal operational mode once the virtualized state for the GCU is determined.

20 Claims, 7 Drawing Sheets

REVERSE DIRECTORY

| BLOCK | ADDRESS |
|---|---|
| LBA A | LOC 1 |
| LBA B | LOC 2 |
| LBA C | LOC 3 |
| LBA D | LOC 4 |
| LBA E | LOC 5 |
| LBA A | LOC 6 |
| ⋮ | ⋮ |

RESTORING VIRTUALIZED GCU STATE INFORMATION

RELATED APPLICATION

The present application is a continuation of U.S. patent application Ser. No. 13/658,673 filed Oct. 23, 2012 and which will issue on Jan. 20, 2015 as U.S. Pat. No. 8,938,597.

SUMMARY

Various embodiments of the present disclosure are generally directed to a method and apparatus for managing data in a memory, such as but not limited to a flash memory.

In accordance with some embodiments, initial state information is stored which identifies an actual state of a garbage collection unit (GCU) of a memory during a normal operational mode. During a restoration mode after a memory power cycle event, a virtualized state of the GCU is determined responsive to the initial state information and to data read from the GCU. The memory is transitioned from the restoration mode to the normal operational mode once the virtualized state for the GCU is determined.

These and other features which may characterize various embodiments can be understood in view of the following detailed discussion and the accompanying drawings.

DETAILED DESCRIPTION

The present disclosure generally relates to the management of data in a memory, such as but not limited to a flash memory of a data storage device.

Data storage devices generally operate to store blocks of data in memory. Some memories employ data management systems to track the physical locations of the blocks so that the blocks can be subsequently retrieved responsive to a read request for the stored data.

Some forms of data storage devices, such as solid state drives (SSDs), can be arranged to write data to a new available location each time a block is presented for writing. Over time, multiple versions of the same block may persist in memory, with one of the versions being the most current data and the remaining versions being older, stale data. Metadata can be generated and used to track the locations and status of the stored data. The metadata may track the relationship between logical and physical addresses of the blocks.

Data management systems often expend considerable effort in maintaining the metadata in an up-to-date and accurate condition. Metadata failures can occur from time to time due to a variety of factors, including loss or corruption of the stored metadata, failures in the circuitry used to access the metadata, incomplete updates of the metadata during a power interruption, etc. In some cases, a metadata failure may result in an older version of data being returned to the host. In other cases, a metadata failure may render the entire device inoperable.

In some storage systems, certain types of metadata relating to the state of the system may be updated on a highly frequent basis. For example, a staleness count, indicative of the total number of stale blocks in a GCU, may be incremented during each write operation to that GCU. In high performance environments, this may result in several tens of thousands, or hundreds of thousands (or more) of state changes per second. Other types of state information may be similarly updated at a high rate, such as aging (e.g., data retention values) associated with the GCUs.

It can be prohibitively expensive to directly update fast changing state information in non-volatile memory for a variety of reasons, including the overhead processing requirements and system bandwidth needed to carry out the updates to the memory as well as the possibility of wearing out the memory due to the sheer number of repetitive writes. It is thus common to accumulate updates to state information in local volatile memory, and then periodically transfer snapshots of the state information to the non-volatile memory array.

While this latter approach can address the overhead processing and wear concerns of writing directly to the array, it also raises the possibility that the state information may be lost due to a power interruption or other disturbance event. Inaccuracies in state information can impact system performance in a variety of ways, such as by causing the system to make non-optimal selections of GCUs for garbage collection operations and to increase the incidence of write amplification (writing duplicate sets of the same data blocks).

Accordingly, various embodiments disclosed herein are generally directed to restoring virtualized GCU state information in a data storage device memory, such as a flash memory, after a power cycle event. As explained below, initial state information indicating the actual state of a GCU of a memory is identified during a normal operational mode of the device. The device is subjected to a power cycling event, and a virtualized state of the GCU is obtained after the power cycling event. The virtualized state of the GCU is based on the actual state of the GCU prior to the event and on data read from the GCU after the event. The device is thereafter transitioned to the normal operational mode after the virtualized state for the GCU is determined.

In some embodiments, the initial state is a staleness count for the GCU which indicates the total number of stale blocks of data in the GCU. The estimated state is an estimated staleness count that is incremented by comparing a forward pointer sequence and a reverse directory sequence associated with the GCU. In other embodiments, the actual state is an aging of the GCU in terms of elapsed time of operation and the estimated state is an estimated age determined responsive to a timestamp recorded prior to the power cycling event and an operational parameter measurement of the GCU after the power cycling event.

In some embodiments, a storage device enters an operationally ready mode upon initialization during which the device can service access commands (e.g., reads and writes) from a host. During the operationally ready stage, a number of restoration routines are carried out to obtain estimated state information for the various active GCUs. At the conclusion of the virtualization routines, the device transitions to a normal operational mode.

Figure 1:
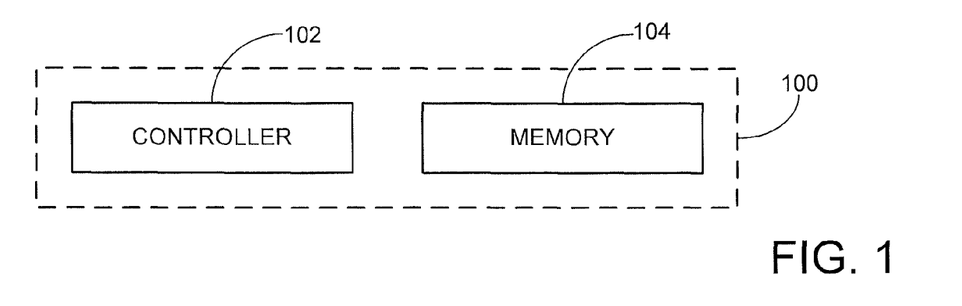
FIG. 1 provides a functional block representation of a data storage device arranged to communicate with a host device in accordance with some embodiments of the present disclosure.

These and other features of various embodiments can be understood beginning with a review of FIG. 1, which provides a functional block diagram of a data storage device 100. The device 100 includes a controller 102 and a memory module 104.

The controller 102 provides top level control for the device, and may be realized as a hardware based or programmable processor. The memory module 104 provides a main data store for the device 100, and may be a solid-state memory array, disc based memory, etc. While not limiting, for purposes of providing a concrete example the device 100 will be contemplated as a non-volatile data storage device that utilizes flash memory in the memory 104 to provide a main memory for a host device. The configuration may be a stand-alone environment such as the case of a personal computer or portable electronic device, a larger data management system such as a mass storage RAID system, etc.

Figure 2:
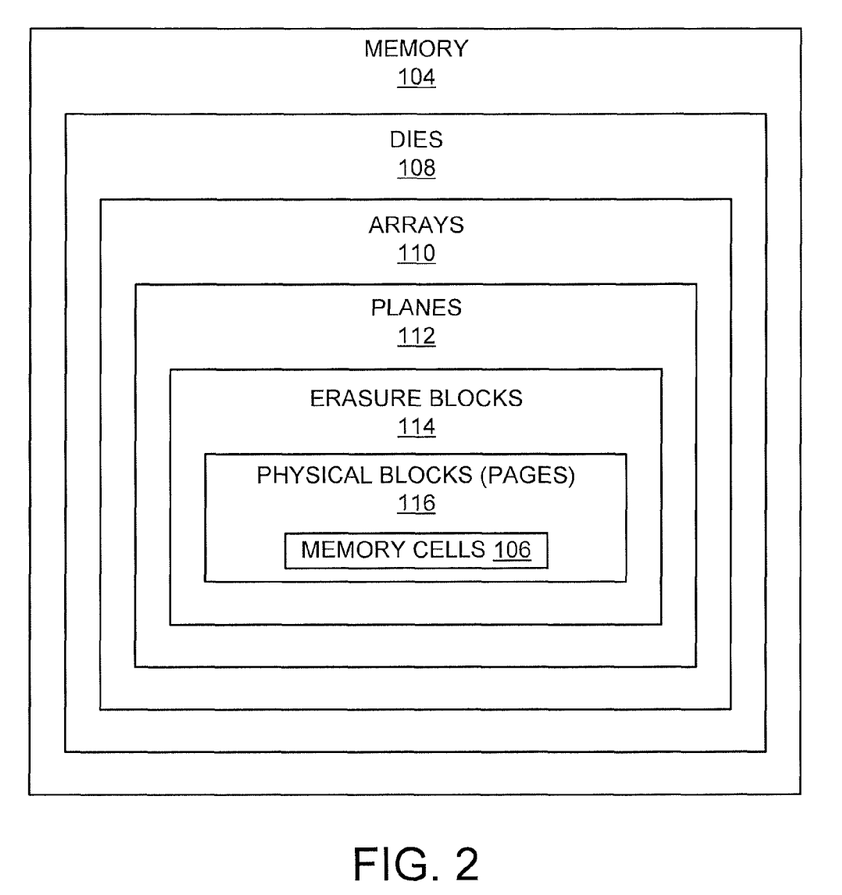
FIG. 2 shows a hierarchy of addressable memory levels in the memory of FIG. 1.

FIG. 2 illustrates a hierarchical structure for the memory 104 in FIG. 1. The memory 104 includes a number of addressable elements from a highest order (the memory 104 itself) to lowest order (individual flash memory cells 106). Other structures and arrangements can be used.

The memory 104 takes the form of one or more dies 108. Each die may be realized as an encapsulated integrated circuit (IC) having at least one physical, self-contained semiconductor wafer. The dies 108 may be affixed to a printed circuit board (PCB) to provide the requisite interconnections. Each die incorporates a number of arrays 110, which may be realized as a physical layout of the cells 106 arranged into rows and columns, along with the associated driver, decoder and sense circuitry to carry out access operations (e.g., read/write/erase) upon the arrayed cells.

The arrays 110 are divided into planes 112 which are configured such that a given access operation can be carried out concurrently to the cells in each plane. For example, an array 110 with eight planes 112 can support eight concurrent read operations, one to each plane.

The cells 106 in each plane 112 are arranged into individual erasure blocks 114, which represent the smallest number of memory cells that can be erased at a given time. Each erasure block 114 may in turn be formed from a number of pages (rows) 116 of memory cells. Generally, an entire page worth of data is written or read at a time.

Figure 3:
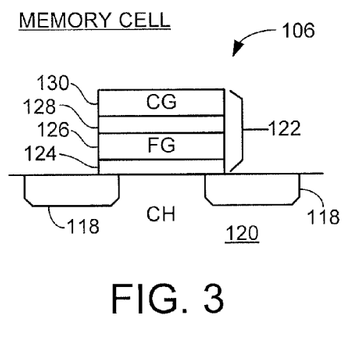
FIG. 3 shows a flash memory cell construction that can be used in the device of FIG. 1.

FIG. 3 illustrates an exemplary flash memory cell 106 from FIG. 2. Localized doped regions 118 are formed in a semiconductor substrate 120. A gate structure 122 spans each pair of adjacent doped regions 118 and includes a lower insulative barrier layer 124, a floating gate (FG) 126, an upper insulative barrier layer 128 and a control gate (CG) 130. The flash cell 106 thus generally takes a form similar to a nMOSFET (n-channel metal oxide semiconductor field effect transistor) with the doped regions 118 corresponding to source and drain terminals and the control gate 130 providing a gate terminal.

Data are stored to the cell 106 in relation to the amount of accumulated charge on the floating gate 126. A write operation biases the respective doped regions 118 and the control gate 130 to migrate charge from a channel region (CH) across the lower barrier 124 to the floating gate 126. The presence of the accumulated charge on the floating gate tends to place the channel in a non-conductive state from source to drain. Data are stored in relation to the amount of accumulated charge.

A greater amount of accumulated charge will generally require a larger control gate voltage to render the cell conductive from source to drain. Hence, a read operation applies a sequence of voltages to the control gate 130 to identify a voltage magnitude required to place the channel in a conductive state, and the programmed state is determined in relation to the read voltage magnitude. An erasure operation reverses the polarities of the source and drain regions 118 and the control gate 130 to migrate the accumulated charge from the floating gate 126 back to the channel.

The cell 106 can be configured as a single-level cell (SLC) or a multi-level cell (MLC). An SLC stores a single bit; a normal convention is to assign the logical bit value of 1 to an erased cell (substantially no accumulated charge) and a logical bit value of 0 to a programmed cell (presence of accumulated charge). An MLC stores multiple bits, such as two bits. Generally, n bits can be stored using $2^n$ storage states.

Figure 4:
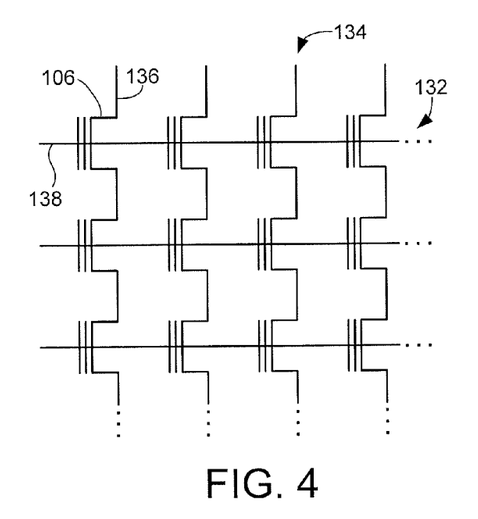
FIG. 4 is a schematic depiction of a portion of a flash memory array using the cells of FIG. 3.

FIG. 4 shows a NAND arrangement of memory cells such as 106 in FIG. 3 arrayed in rows 132 and columns 134. Each column 134 of adjacent cells can be coupled via one or more bit lines (BL) 136. The control gates 130 of the cells 106 along each row 132 can be interconnected via individual word lines (WL) 138.

Figure 5:
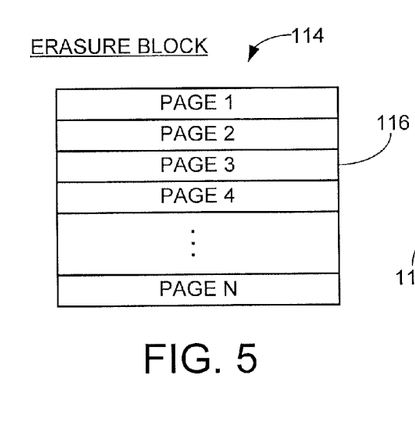
FIG. 5 illustrates an exemplary format for an erasure block of the memory array.
Figure 6:
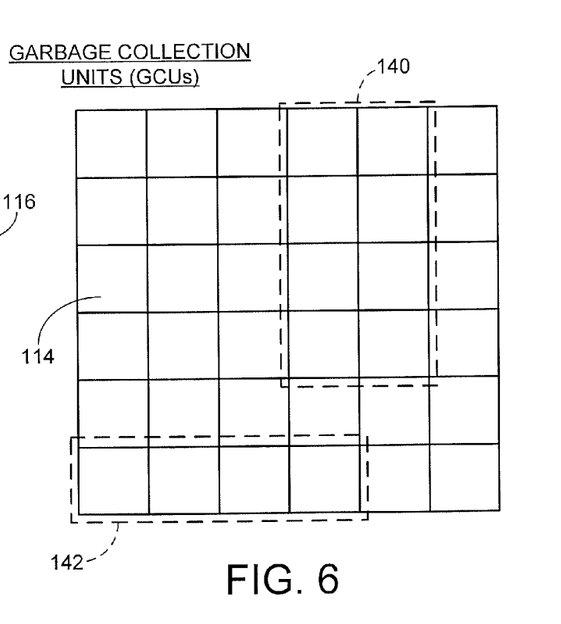
FIG. 6 shows the arrangement of multiple erasure blocks from the memory array into garbage collection units (GCUs).

An exemplary format for a selected erasure block 114 is depicted in FIG. 5. The block 114 includes N pages 116, with each page corresponding to a row 132 in FIG. 4. The erasure blocks 114 are combined into multi-block garbage collection units (GCUs) as represented in FIG. 6 at 140 and 142. It will be noted that the various erasure blocks 114 shown in FIG. 6 may not be necessarily physically adjacent one another.

The GCU 140 is formed of eight (8) erasure blocks 114, and a second GCU 142 is formed of four (4) erasure blocks 114. The GCUs in a given memory may all be the same size, or may have different sizes. All of the erasure blocks 114 may be initially grouped into GCUs, or the GCUs may be formed and allocated (placed into service to store data) as needed during the operational life of the device.

Figure 7:
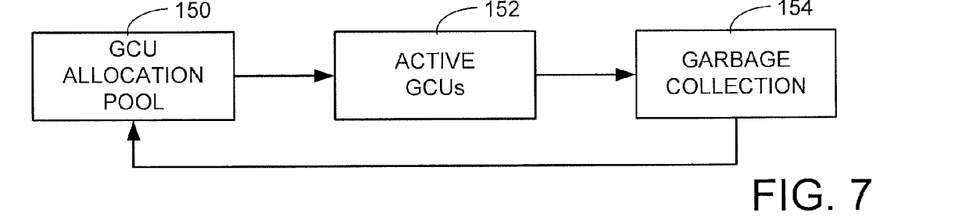
FIG. 7 shows different operational stages of the GCUs of FIG. 6.

FIG. 7 illustrates various operational stages for GCUs such as in FIG. 6. These stages include a GCU allocation pool 150, active GCUs 152 and GCUs subjected to garbage collection processing 154. GCUs in the allocation pool 150 are in an erased state and are waiting to be allocated (placed into service to store user data) as required. Once allocated, the GCUs are moved to the active GCU stage 152.

Over time, the GCUs in the active stage 152 will become filled with data. The data will become increasingly stale as newer versions of the data are stored in other GCUs. Eventually, the active GCUs will be scheduled for garbage collection and transferred to stage 154. A garbage collection operation generally entails identifying currently valid data within the associated GCU, migrating the valid data to another location (e.g., a different GCU), and performing an erasure on each of the erasure blocks in the GCU. Once the garbage collection operation is completed, the GCU is returned to the reallocation pool 150 pending subsequent allocation.

The decision to subject an active GCU to garbage collection can be based on a variety of factors, including system utilization requirements, aging, staleness, parametric performance, history information associated with the GCU, etc. Various types of state information can be maintained for each of the GCUs to aid in the garbage collection determination.

Figures 8, 9, 10, 11:
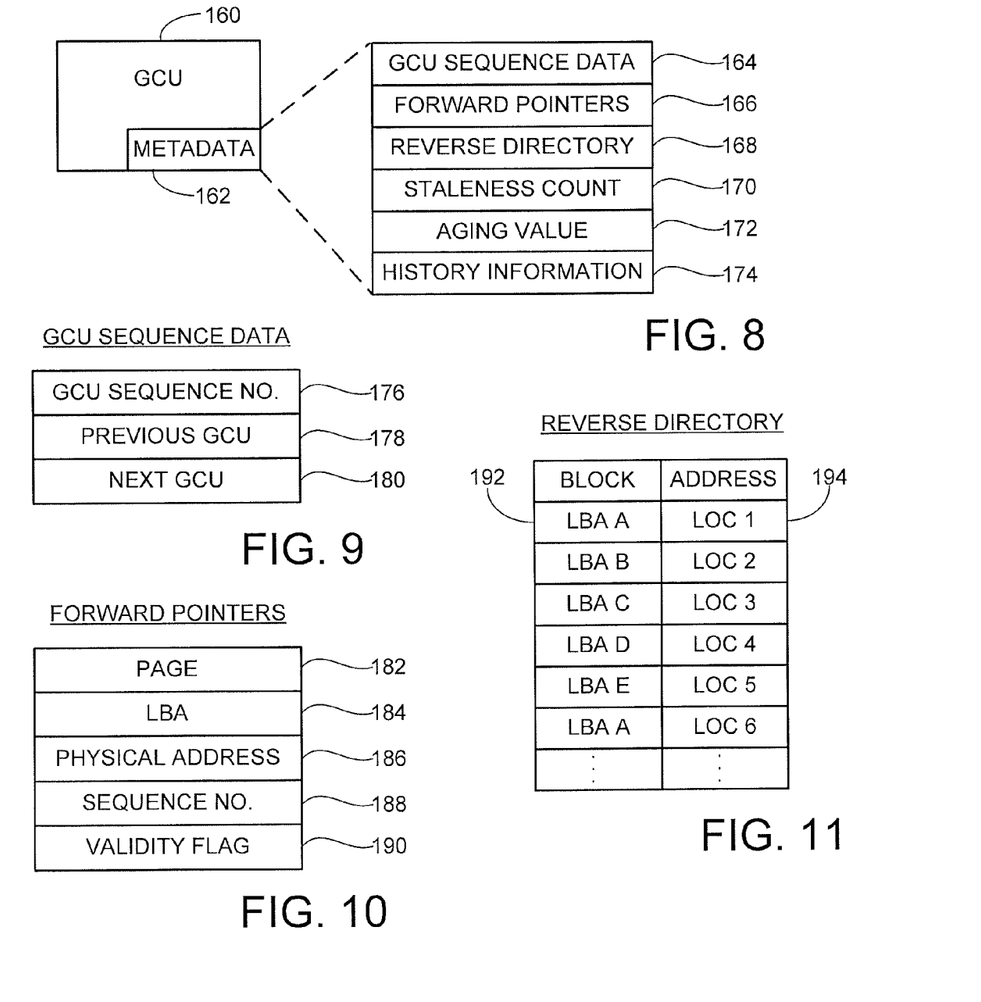
FIG. 8 illustrates a sample metadata format that can be used in accordance with some embodiments.
FIG. 9 is an example format for GCU sequence data from FIG. 8.
FIG. 10 is an example format for forward pointer data from FIG. 8.
FIG. 11 is an example format for a reverse directory table of FIG. 8.

An exemplary format a GCU 160 is shown in FIG. 8. The GCU includes metadata 162 useful by the device 100 in performing write, read, erasures and garbage collection operations thereon. While the metadata 162 is shown to be physically stored within the GCU 160, it will be appreciated that the metadata may be stored elsewhere in non-volatile memory, such as in specially configured metadata locations. It will be appreciated that all of locations where the user data and metadata stored in the non-volatile memory associated with a particular GCU are considered as included within the GCU, and these locations need not be necessarily contiguous.

A sample format for the metadata is shown in FIG. 8 to include GCU sequence data 164, forward pointers 166, a reverse directory 168, a staleness count 170, one or more aging values 172 and history information 174. Other formats can be used as desired so the exemplary formats of FIGS. 8-11 are provided merely for purposes of providing an illustrative example and are not limiting.

FIG. 9 shows the GCU sequence data 164 from FIG. 8 to include a number of fields such as a GCU sequence number field 176, a previous GCU 178 and a next GCU 180. The GCU sequence number field 176 stores a sequence number for the GCU to uniquely identify that GCU. This value can take a variety of forms including a physical or logical address for the GCU, an arbitrarily assigned value applied to the GCU upon allocation, an incremented count value assigned upon allocation, a time/date stamp associated with the allocation of the GCU, etc. The previous GCU value of field 178 takes a similar format and identifies the GCU that was allocated immediately prior to the current GCU. The next GCU value of field 180 also takes a similar format and identifies the GCU that was allocated immediately after the allocation of the current GCU.

The forward pointer data 166 from FIG. 8 is shown in FIG. 10 to include a page identifier field 182, an LBA (logical block address) field 184, a physical address field 186, a sequence number field 188 and a validity (staleness) flag 190. In some embodiments, forward pointer data as set forth in FIG. 10 is provided for each block of data stored in the GCU. The data may be set forth in a table form at the end of the GCU, in the form of headers at the beginning of each erasure block, as headers at the beginning of each page in the GCU, etc.

The page identifier identifies the page within the GCU at which the associated data block is stored. The LBA field identifies the logical address for the block, and the physical address field provides a corresponding physical address within the GCU for the block. The physical address may be a physical block address, PBA or other bit address data such as length, offset, etc. The sequence number can be a forward pointer pointing to a next location, such as a different GCU in which a newer version of the data block is stored. The validity flag can provide a staleness flag bit (e.g., flag=1 means current data; flag=0 means stale data).

FIG. 11 shows the reverse directory table 168 from FIG. 8, which is used in accordance with various embodiments to provide virtualized (estimated) staleness counts as explained below. The reverse directory table provides a listing of each block (e.g., LBA) 192 stored in the GCU 160 and the associated address, or location 194, at which the block is stored in the GCU.

The reverse directory is organized so that the location of each block (e.g., "sector" or "map unit") of data listed in the directory represents a physical address within the GCU. These locations can be expressed as offsets from a starting physical address, or using some other convention.

The reverse directory is updated during each write operation to the GCU to identify the most recently written block to the GCU. The reverse directory table is written to the GCU as part of each data write operation so that no additional, separate writing operations are required to build and maintain the reverse directory table apart from the writing operations used to write the user data.

Referring again to FIG. 8, the staleness count 170 is an accumulated count of blocks in the GCU 160 that are stale. As used herein, "stale" generally refers to blocks that are no longer the most currently active version of those blocks, such as older versions of particular LBAs, or blocks that are in a discarded state, such as those that make up files or data sets that have been "deleted" by the user. Maintaining a separate staleness count reduces the need for the system to evaluate the forward pointer data and evaluate each block in turn to determine how many blocks are stale within a given GCU.

The aging value can take a variety of forms, such as a time/date stamp value associated with the allocation of the GCU into the active stage. By subtracting the current time/date, an elapsed time interval can be determined. The aging value may reflect total elapsed time since allocation, or total operational time during that interval. Other formats for the aging value can be used as well, including elapsed time since the oldest access operation upon the GCU, etc.

The history information 174 generally relates to performance and use metrics associated with the GCU. The history information may be global information, such as information that has been accumulated for the entire service life of the GCU. The history information may additionally or alternatively be session based, such as accumulated information for the service life of the GCU since it was most recently allocated.

Parameters can take a variety of forms and may include total writes/erasure cycles; total read operations; parametric drift measurements (e.g., read disturb, voltage drift, etc.); temperature data associated with the GCU, etc. The data may be combined into a combined/weighted measurement that indicates the state of the GCU using a bloom filter or other measurement algorithm.

During normal operation of the device 100, the metadata 162 is retrieved and stored in a local volatile memory for access by a controller. The forward pointer data is arranged into a forward map used to service access operations from a host device.

Figure 12:
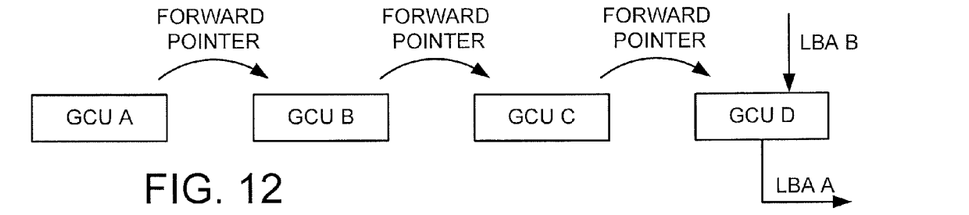
FIG. 12 illustrates a forward search operation to locate a most current version of a data block using the GCU sequence data and forward pointers of FIGS. 9-10.

FIG. 12 generally represents forward search operations carried out during access (read and write operations). A read operation retrieves the most recent version of a selected LBA, and a write operation writes a new LBA to the GCU. To read an existing LBA, denoted in FIG. 12 as "LBA A," the search methodology begins by identifying the oldest active GCU and searching the metadata to determine whether the GCU has any entries associated with the requested block. The oldest GCU (GCU A) is identified by examining the GCU sequence data (FIG. 9) of each of the allocated GCUs in the active stage (FIG. 7), and locating the GCU with the oldest sequence number.

The forward pointer data (FIG. 10) for GCU A is examined to determine whether any entries existed for LBA A within the GCU. The sequence of FIG. 12 shows that GCU A includes an entry for LBA A having a forward pointer to GCU B. The system proceeds to load and examine the forward pointer data for GCU B, which provides an entry with a forward pointer to GCU C. The forward pointer data for GCU C provides an entry with a forward pointer to GCU D. The forward pointer data for GCU D has a current entry indicating the physical address of the most current version of LBA A within GCU D (e.g., page, bits, offset, etc.). The system proceeds with a read operation upon this location and the requested LBA is output and returned to the host.

If the oldest active GCU does not provide an entry for the requested LBA, the system proceeds to search the next oldest active GCU and so on until either a forward pointer is located, the most current version of the LBA is located, or the data block is not found.

The forward search methodology of FIG. 12 is performed during a write operation to write a block of data ("LBA B") by locating the oldest active GCU (GCU A) and searching the forward pointer data for entries listing LBA B, and following the pointers to each new GCU, which in this case is from GCU A to GCU B and then from GCU B to GCU C. For simplicity of illustration, the same GCU sequence is followed for both the read operation for LBA A and the write operation for LBA B, although it will be appreciated that each access operation may follow its own GCU sequence along the forward search. It will also be appreciated that the forward pointers may point to other locations within the same GCU and do not necessarily point to a different GCU.

In FIG. 12, the forward search finds the "then-existing" current version of LBA B to be stored in GCU C. The system proceeds to write the new version of data to GCU D, provide associated forward pointer data for this new entry, change the status of the metadata entry for LBA B in GCU C from "current" to "stale," and add a forward pointer to GCU C to point to the new location for the written data in GCU D.

Various state information updates are carried out in conjunction with the foregoing read and write operations. These state information updates may include updating write and read counters are updated, updates to the reverse directory table with a new entry for the newly written LBA A block, temperature measurements, date code entries, staleness count updates, etc.

The metadata necessary to service these access operations may be transferred from non-volatile memory (e.g., from the GCUs A-D) to a local volatile memory, and the updated metadata may be transferred back to the flash memory array at a suitable time. While this system is operable during normal operation of the device to maintain an accurate assessment of the state of the system, the system is further configured to restore these and other types of state information upon device initialization.

Figure 13:
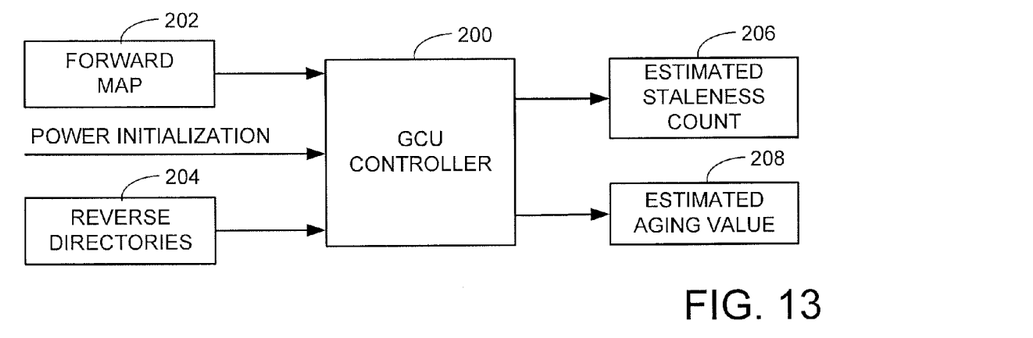
FIG. 13 is a functional block representation of a circuit useful in accordance with some embodiments to provide virtualized state information for the GCUs after a power cycle event.

FIG. 13 illustrates a GCU controller circuit 200. The controller circuit 200 can be realized in hardware, software or firmware, and may be a separate controller or form a portion of the top level controller functionality of FIG. 1. The GCU controller circuit 200 generally operates in response to a power initialization signal which indicates that the device has undergone a power cycle event. The controller circuit 200 uses forward map data 202 and reverse directory data 204 from the pool of active GCUs to arrive at estimated (virtualized) state information for each of the active GCUs, such as an estimated staleness count 206 and an estimated aging value 208. The virtualized state information is thereafter utilized by the device during normal operation of the device 100.

Figure 14:
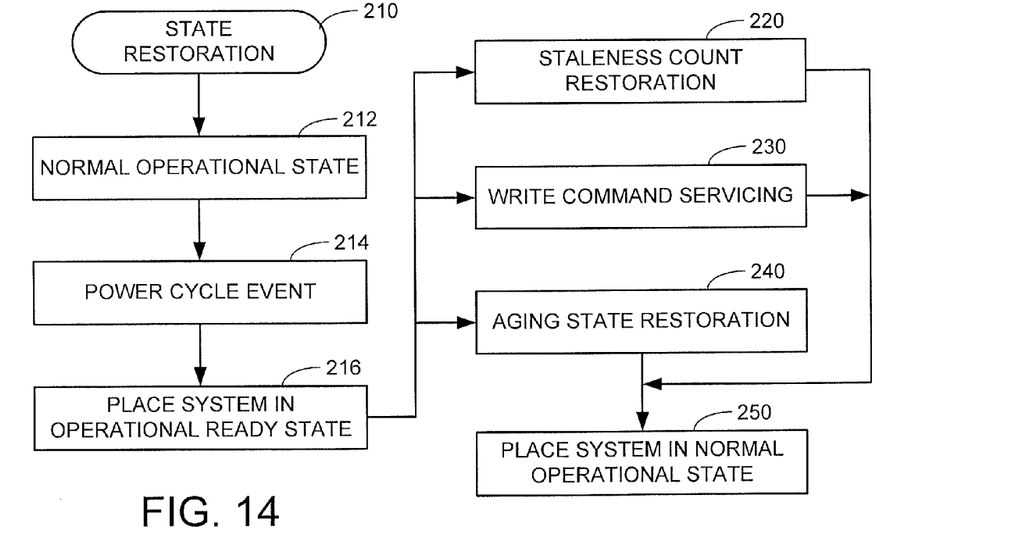
FIG. 14 is a flow chart for a STATE RESTORATION routine.

FIG. 14 provides a STATE RESTORATION routine 210 to set forth steps performed by the controller 200 in accordance with some embodiments. Step 212 represents a normal operational state for the device 100. During this normal operational state, read and write operations may be carried out in a normal fashion from time to time as discussed in FIG. 12, and GCUs are cycled through their various operational stages (allocation pool, active, garbage collection) as depicted in FIG. 7.

A power cycle event is depicted at step 214. This represents a disturbance event that interrupts normal processing of the device. The power cycle event can take a variety of forms, such as the power being turned off and then back on by a user of the device. An unscheduled or inadvertent power loss may also be represented by the event, as well as a soft reset of the controller device. In the case of a USB style thumb drive, the power cycle event may involve removal of the device by the user from a connection port with or without safely ejecting the device. Corruption or loss of data in volatile memory is contemplated but not necessarily required. The time during which the device is in a non-powered state may be of short or long duration. It is presumed, although not necessarily required, that the device successfully transferred all pending metadata to non-volatile memory prior to the disturbance event.

Upon reinitialization of the device after the power cycle event, the controller 200 places the system into an operationally ready state as indicated by step 216. This may involve a number of self-tests and the loading of various programs and data. It is contemplated that the operationally ready state indicates that the device is "on-line" and in a position to begin normal data transactions (servicing access commands) with a host.

The controller 200 next enters a restoration mode of operation in which several operations are carried out in the background to place the device 100 in a normal operational state. The restoration mode may involve steps that are carried out concurrently or sequentially on each of the currently active GCUs until all are "restored" with updated state information. These steps can include a staleness count restoration routine as depicted at step 220 (FIG. 15), a write command servicing routine at step 230 (FIG. 16), and an aging state restoration routine at step 240 (FIG. 17).

Once these respective operations are successfully concluded, the controller exits the restoration mode and enters normal operational mode at step 250. The normal mode of operation continues until the next power cycling event is encountered (step 214). From a host standpoint, there may be no change detected as the system transitions from the operational ready state to the normal operational state. However, as desired a communication can be provided by the device 100 to the host that the background restoration processing is completed.

Figure 15:
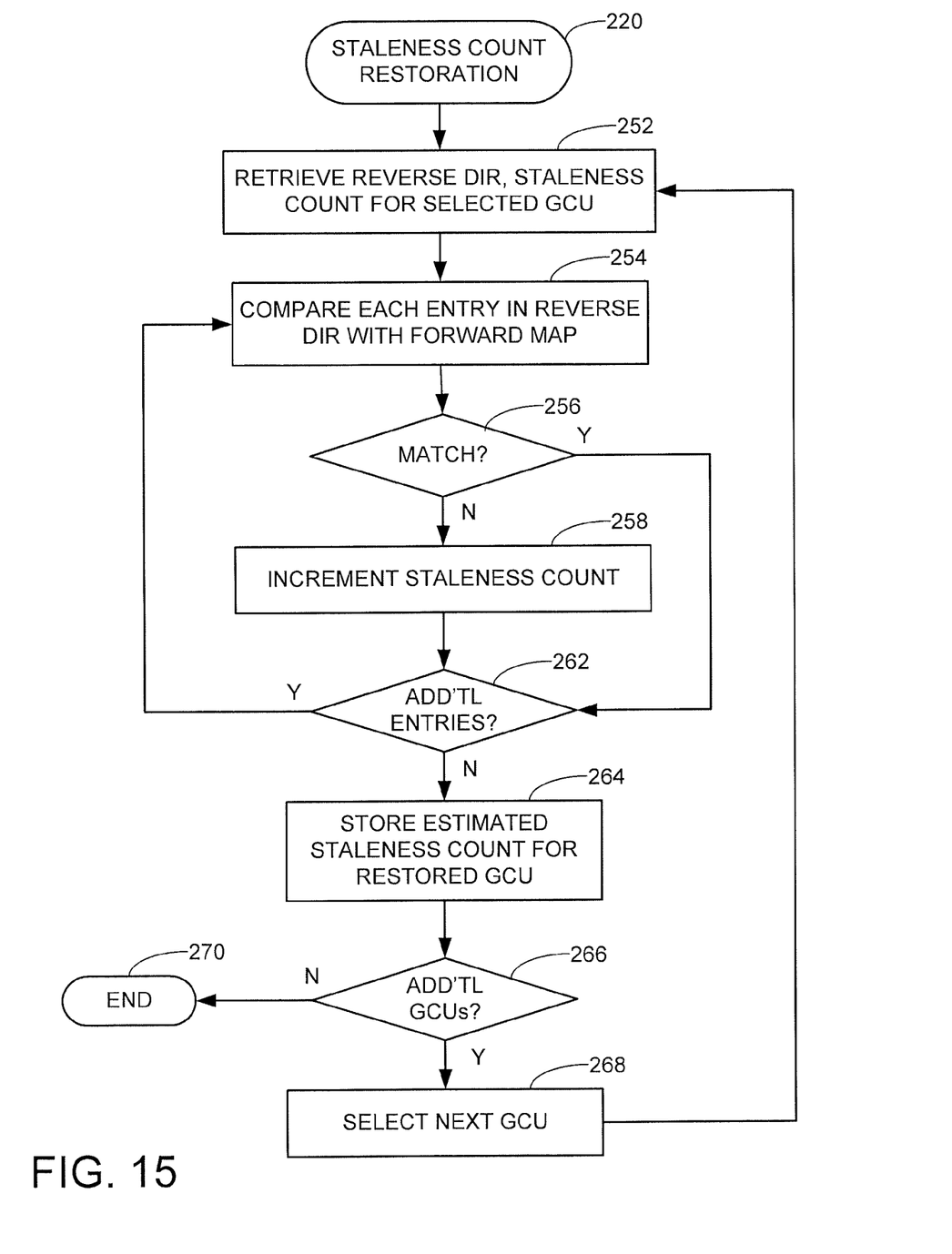
FIG. 15 is a flow chart for a STALENESS COUNT RESTORATION routine.

FIG. 15 is a flow chart to depict the STALENESS COUNT RESTORATION routine 220 in accordance with some embodiments. The routine 220 generally operates to arrive at an accurate estimate of the staleness count for each active GCU. Generally, as each reverse directory is read into the memory by the controller 200, the controller will compare the lookup value of the block in the forward mapping table to identify a physical address location, and compare this physical location to the physical address location identified by the reverse directory. If the two physical addresses match, the block is determined to still be current (valid) and the staleness count for the GCU is not incremented. If the two physical addresses do not match, which may include the case where multiple versions of the same block are resident in the same GCU, the staleness count for the GCU will be incremented.

Once all the blocks from the reverse directory for the first GCU have been compared to the forward map, the GCU is identified as being "restored" and the next reverse directory for the next active GCU is read and compared. Once all of the reverse directories for all of the GCUs have been read, the system transitions to the normal mode of operation.

At step 252, the reverse directory data (e.g., 168, 204) and current staleness count data (e.g., 170) are initially retrieved for a first selected GCU. At step 254, each block in the reverse directory is compared to the forward map to determine whether the physical address for the block in the reverse directory represents the most current version of that block. The forward map can be searched as discussed above in FIG. 12.

Decision step 256 determines whether the physical addresses match; if not, the retrieved staleness count for the selected GCU is incremented, step 258. The routine continues at decision step 262 to determine whether additional entries (blocks) require comparison. If so, the routine returns to step 254 where the next block from the reverse directory table is evaluated.

Once all of the entries in the reverse directory table have been compared, a final accumulated (estimated) staleness count for the restored GCU is stored at step 264. In some embodiments, this count value is overwritten or otherwise replaces the previous count value retrieved in step 252. Decision step 266 determines whether additional GCUs require evaluation, and if so, the next GCU is selected at step 268 and the foregoing steps are repeated.

At the conclusion of the routine (step 270), all of the GCUs will have been restored with regard to the staleness information and the system is ready to enter normal operation, pending the completion of other steps carried out by the system during the restoration mode. It will be noted that the servicing of write commands during the routine of FIG. 15 may result in further increments to the final staleness count for pending GCUs, as discussed next in FIG. 16.

Figure 16:
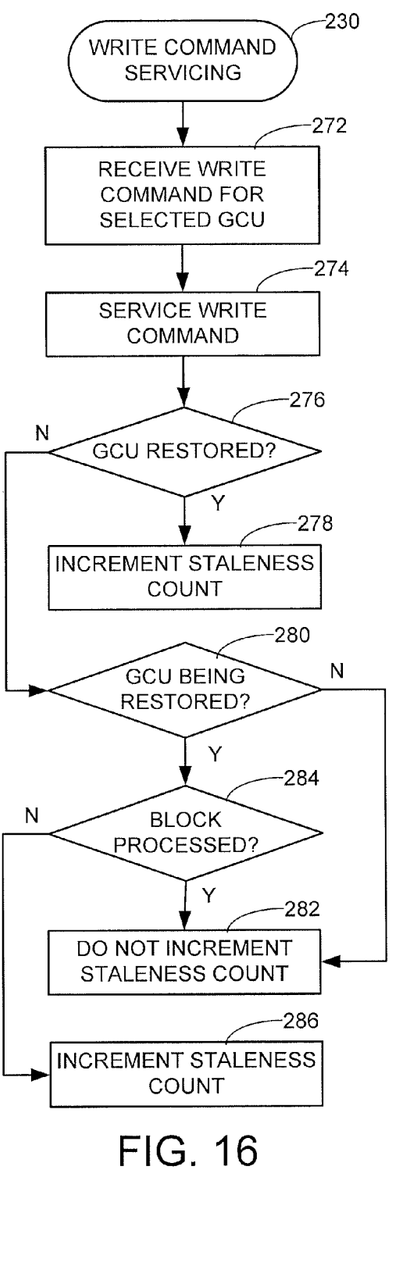
FIG. 16 is a flow chart for a WRITE COMMAND SERVICING routine.
Figure 17:
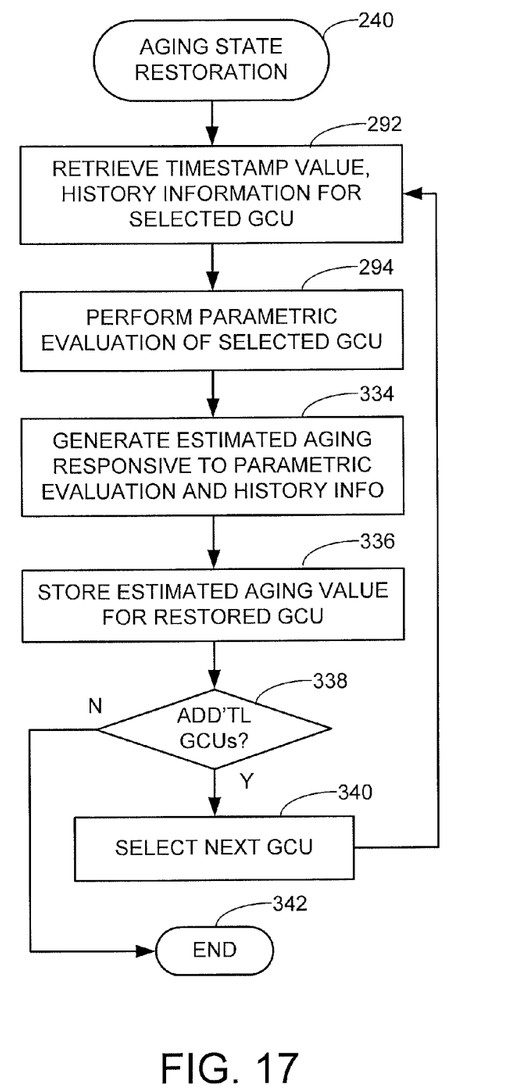
FIG. 17 is a flow chart for an AGING STATE RESTORATION routine.

FIG. 16 is a flow chart for the WRITE COMMAND SERVICING routine 230 of FIG. 14. The routine 230 generally represents steps carried out to service host write commands that are received and processed during the staleness restoration of FIG. 15.

Read commands serviced during the operation of FIG. 15 do not present any particular difficulties in that the staleness counts will tend to remain unchanged and the forward mapping data will continue to point to the most current version of each block. Any write operations that occur during the restoration of the staleness data, however, may tend to affect the staleness counts for the data.

Generally, it is contemplated that write operations encountered during the restoration process of FIG. 15 may occur in one of three ways: the write operation may take place upon a GCU that has not yet been restored; the write operation may take place upon a GCU that has already been restored; or the write operation may take place upon a GCU that is currently in the process of being restored.

Write operations upon GCUs that have not yet been restored will be accounted for during the normal restoration process. That is, the write operation will result in an updated entry in the GCU reverse directory, and the subsequent evaluation of that entry in comparison with the forward mapping table will show that the entry is current and hence, no increment to the staleness count is necessary.

In the case where the GCU has already been restored, it is a straightforward matter to increment the staleness count for the GCU for each write operation that is subsequently performed during the restoration mode for that GCU. For write commands serviced by a GCU currently undergoing restoration, an analysis is made whether the particular block(s) associated with the write command have been evaluated. If the blocks have already been evaluated, the staleness count is incremented. If the blocks have not yet been evaluated, no increment is provided.

With respect to the flow of FIG. 16, the routine is carried out at any time a write command is received from the commencement of the restoration process until the device is transitioned to normal operation. Each of the above contingencies will be addressed in turn.

A write command is initially received at step 272, and the command is serviced at step 274. This is carried out as described above, including a forward search to locate the (then) most recently stored version of the write data, to mark the metadata associated with that version with a staleness flag and a forward pointer, and the writing of the data to a new location. The reverse directory for the target GCU is also updated with a new entry reflecting the location within the target GCU of the newly added block.

Decision step 276 next determines whether the target GCU has been restored pursuant to the routine 220 of FIG. 15. If so, the virtualized staleness count obtained during the routine 220 of FIG. 15 is incremented by one count. If the target GCU has not completed the restoration process, the routine passes to step 280 in which an inquiry is made whether the target GCU is currently being restored. If not, the routine passes to step 282 and the staleness count is not incremented.

If the target GCU is currently being restored, the routine passes to step 284 in which an inquiry is made whether the specific block(s) associated with the write command have been processed by the routine of FIG. 15. If so, the count is not incremented (step 282). If not, the staleness count is incremented (step 286).

FIG. 17 provides a flow chart for the AGING STATE RESTORATION routine 240 of FIG. 14. This routine may be carried out before, during or after the staleness restoration routine 220 of FIG. 15 and operates to provide a virtualized aging value for each active GCU.

The routine 240 operates to retrieve the aging data (e.g., time/date stamp data) for each of the active GCUs, and to adjust this aging data based on parametric measurements and history data associated with the GCUs. This will provide a virtualized (estimated) age of the GCU that may take into account a variety of factors such as the time and/or temperature of the GCU while the device was in a powered down and an operational state.

As shown by FIG. 17, the aging value(s) and history information for a first selected GCU are retrieved at step 292. These data may be stored in the GCU metadata as discussed above in FIG. 8. A parametric evaluation is next performed upon the GCU at step 294. This parametric evaluation can take a variety of forms, including performing one or more read operations upon a signature area of the GCU and measuring the degradation of the area.

In some embodiments, the parametric evaluation examines variations in the total amount of accumulated charge on individual cells within the GCU. Exemplary charge distribution ranges are provided in FIG. 18 at 300, 302, 304 and 306. These charge distributions represent different amounts of accumulated charge on respective populations of cells programmed to different charge states C0-C3. These states correspond to MLC programming logic states 11, 10, 00 and 01, as shown. Other forms of programming, including SLC programming, may be used. Read threshold voltages V1-V4 can be used to differentiate between the respective charge states.

Figure 18:
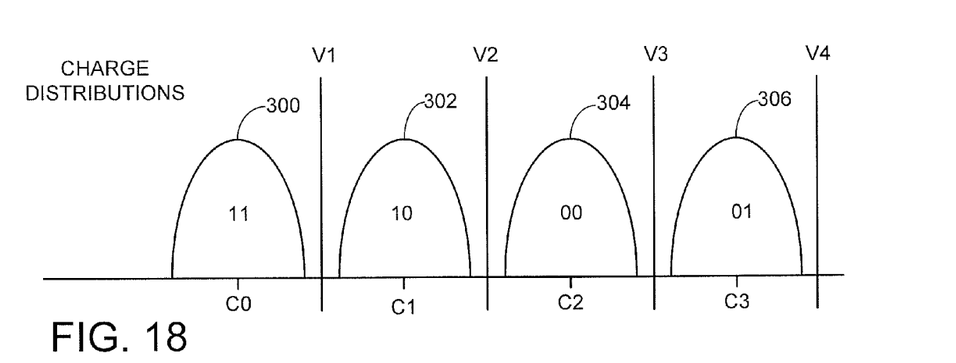
FIG. 18 illustrates a population of example charge distributions for memory cells in the array of FIG. 6.

Some of the variation represented in FIG. 18 may relate to the programming process whereby discrete quanta of charge are sequentially applied to the cells to raise the total amount of accumulated charge to the desired range. Other variations in the charge distributions can arise due to operational factors; for example, read disturbance generally operates to modify the amount of total accumulated charge on a cell due to repeated read operations to a cell, or to adjacent cells. Read disturbance tends to induce drift in the charge distribution, either in terms of more accumulated charge (shift to the left in FIG. 18) or less accumulated charge (shift to the right). Programming operations on adjacent cells can also alter the amount of charge on a cell.

Manufacturing variations can affect the extent to which charge is transferred across the lower barrier layer. Wear can also contribute to charge distribution variation. The greater the number of write/erasure cycles on a particular cell, generally the less capable the cell may become in terms of both accepting charge during a programming operation and returning charge to the channel during an erasure operation.

Figure 19:
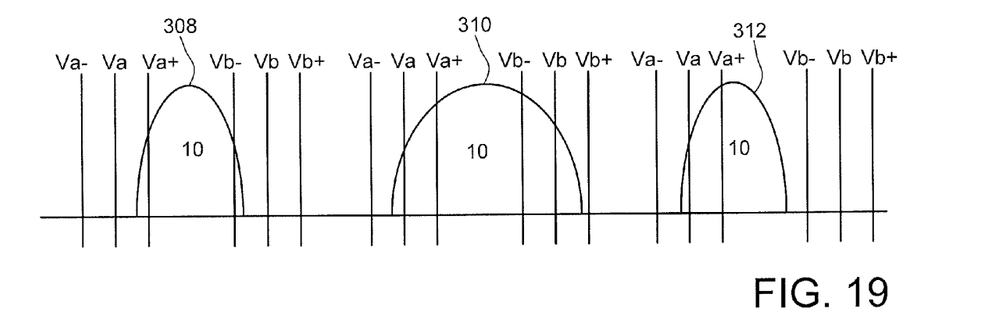
FIG. 19 shows application of different voltage thresholds during the parametric evaluation of FIG. 18.

It follows that the location and range (e.g., width) of a respective charge distribution can be used to assess GCU block performance. FIG. 19 generally represents three alternative charge distributions 308, 310 and 312 for the cells in a selected erasure block programmed to a selected state (in this case, 10).

Distribution 308 is reasonably well behaved and generally has similar range and centering characteristics as the distribution 302 in FIG. 18. Distribution 310 is also reasonably well centered but has a wider relative range. Distribution 312 has a similar range as distribution 308, but is shifted to the left, indicating that the cells have experienced read disturbance or other charge leakage effects that has tended to degrade the total amount of charge on the respective cells.

The ranges and locations of the respective distributions can be evaluated by applying a succession of read voltages to the cells in the distribution. FIG. 19 shows nominal upper and lower read threshold voltages Va and Vb, in conjunction with banded read threshold voltages Va−, Va+, Vb− and Vb+. The banded voltages vary from the nominal read threshold values Va and Vb by some selected interval, such as +/−10%, etc.

Figure 20:
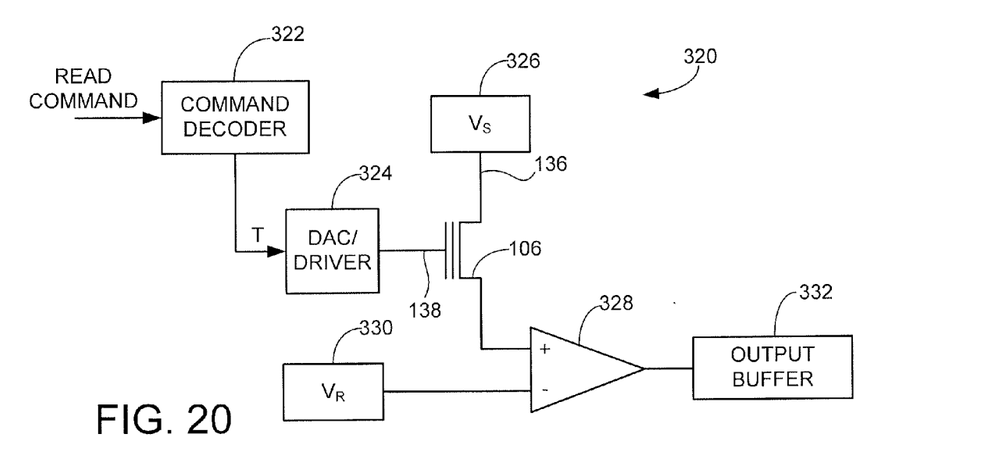
FIG. 20 is a functional block representation of read circuitry that can apply the different voltage thresholds of FIG. 19.

FIG. 20 is a functional block diagram of read circuitry 320 of the device 100 adapted to apply the various threshold voltages in FIG. 19 to assess the distribution characteristics of each of a population of memory cells 106. A command decoder 322 decodes an input read command and outputs an appropriate read threshold value T to a digital-to-analog (DAC) driver circuit 324. The threshold value T is a multi-bit digital representation of a selected analog voltage value from FIG. 19 (e.g., voltage Va). The DAC/driver 324 applies the corresponding analog voltage to the gate structure of the selected cell 106 via the associated word line 138 (see FIG. 4).

A voltage source 326 applies a suitable voltage $V_S$ to the associated bit line 136 coupled to the cell 106. A sense amplifier 328 determines whether the applied voltage is sufficient to place the cell 106 into a conductive state through a comparison with a reference voltage $V_R$ from a reference voltage source 330. A resulting bit value is output to an output buffer 332 (e.g., a 0 or 1) responsive to the comparison.

The range and location of the charge threshold population for a set of cells can be determined by using the circuit of FIG. 20 to apply the various read threshold voltages in FIG. 19 to each cell in the population, and accumulating the results in memory for each of the evaluated memory cells. Referring again to FIG. 17, the parametric evaluation step 294 carries out this operation on a selected population of cells in the GCU, such as a dedicated area where a special test pattern has been previously written, or upon user data at a selected location within the GCU.

The routine proceeds to step 334 where an estimated aging value is generated responsive to the parametric evaluation of step 294. As desired, the estimated aging value is further generated using the history data loaded in step 292. In some embodiments, a virtualized, weighted aging value $V_{AGE}$ can be obtained using a relation such as the following:

$$V_{AGE}=K1^*AGE+K2^*DRIFT+K3^*CYCLES+K4^*TEMP \quad (1)$$

AGE represents the actual (initial) age of the GCU determined from the state information (e.g., field 172 in FIG. 8). DRIFT represents a numerical value indicative of the presence and/or extent of voltage drift determined during the analysis of step 294. CYCLES represents total write/erasure cycles (and/or read cycles for read heavy environments). TEMP is a temperature measure, and K1-K4 are constants. Other formulations can be used including the use of other factors and the use of higher order relationships.

In some embodiments, the results from the virtualized age determination may provide a derating factor F that can be combined with the current age value to generate the estimated age. For example, the derating factor may be a value such as 0.8 or 1.3, so that the virtual age VAGE of the GCU can thereafter be determined using a relation such as:

$$V_{AGE}=F^*AGE \quad (2)$$

In some cases, the virtualized age $V_{AGE}$ value may provide an older "age" than that reported by the actual aging value. In other cases, the virtualized age $V_{AGE}$ value may indicate a younger "age" than that reported by the actual aging value. In still further cases, the virtualized age $V_{AGE}$ value may provide an estimated value that substantially equals the actual aging value. In each case, however, the virtualized age provides a better indication of the actual state of the GCU, leading to better determinations during system management operations.

The virtualized age value is stored at step 336, such as by replacing the then-existing actual age value in the metadata. In this way, the virtualized age value will provide the baseline for the next application of the aging restoration routine. This will allow the aging value to converge under steady state conditions and will allow the aging value to be adaptively adjusted under widely changing conditions. In each case, the aging value will reflect an accurate indication of the virtual age of the GCU.

Decision step 338 determines whether additional GCUs should be evaluated, and if so, the routine selects the next GCU at step 340 and returns to step 292. Once all of the GCUs have been evaluated, the process ends at step 342.

It will now be appreciated that the various embodiments disclosed herein can provide benefits over existing GCU management methodologies. A dynamic GCU state information restoration mechanism as disclosed herein can identify accurate state information for the various GCUs in the system, enabling the controller to better select which GCUs to subject to garbage collection operations. The state information can also be used to gain a better understanding of the life cycle of the GCUs, allowing operational decisions such as where to store different types of data and how to improve wear leveling to extend the life of the array.

While a flash memory array has been provided as an exemplary environment, such is merely for illustration purposes and is not limiting. The techniques disclosed herein are suitable for use in any number of different types of memories, including volatile and non-volatile memories.

It is to be understood that even though numerous characteristics and advantages of various embodiments of the present disclosure have been set forth in the foregoing description, together with details of the structure and function of various embodiments, this detailed description is illustrative only, and changes may be made in detail, especially in matters of structure and arrangements of parts within the principles of the present disclosure to the full extent indicated by the broad general meaning of the terms in which the appended claims are expressed.

What is claimed is:

1. A method comprising:
storing an actual staleness count for a garbage collection unit (GCU) of a memory during a normal operational mode, the actual staleness count indicating a total number of stale data blocks in the GCU;
determining, during a restoration mode after a power cycle event, a virtualized staleness count for the GCU responsive to the actual staleness count, a reverse directory table of the GCU and forward pointer data associated with data blocks written to the GCU; and
transitioning the memory to the normal operational mode after the virtualized staleness count is determined.

2. The method of claim 1, in which the reverse directory table lists, in order, data blocks that have been written to the GCU in turn.

3. The method of claim 1, in which the forward pointer data links successive addresses in the memory to which data blocks sharing a common logical address have been stored.

4. The method of claim 1, in which the reverse directory table identifies, by logical address, data blocks written to the GCU, and the forward pointer data identifies successively written versions of data blocks sharing a common logical address stored among multiple GCUs in the memory.

5. The method of claim 1, further comprising storing an actual aging value for the GCU during the operational mode, the actual aging value indicating a total elapsed time since allocation of the GCU, the method further comprising adjusting the actual aging value to determine a virtualized aging value for the GCU after the power cycle event responsive to a parametric measurement of at least one memory cell in the GCU, wherein the memory is transitioned to the normal operational mode after the virtualized aging value is determined.

6. The method of claim 1, in which the memory is a flash memory array, and the GCU comprises a plurality of erasure blocks in the array that are allocated, used and subjected to garbage collection as a unit.

7. The method of claim 1, further comprising subsequently selecting the GCU for a garbage collection operation during the normal operational mode responsive to the virtualized staleness count.

8. The method of claim 1, in which the determining step comprises, for each data block listed in the reverse directory table, locating a final entry in the forward pointer data corresponding to the listed data block in the reverse directory table, and determining whether the final entry describes an address in the GCU.

9. The method of claim 8, in which the actual staleness count is incremented responsive to the final entry describing an address not located within the GCU.

10. The method of claim 1, further comprising servicing a write command to write data to the memory after the power cycle event and prior to the transitioning of the memory to the normal operational mode and incrementing the actual staleness count for the GCU responsive to the servicing of the write command.

11. The method of claim 10, in which the actual staleness count is incremented responsive to the servicing of the write command by determining a logical address of a data block associated with the write command is included in the reverse directory table.

12. A method comprising:
storing an actual staleness count for a garbage collection unit (GCU) of a memory during a normal operational mode, the actual staleness count indicating a total number of stale data blocks in the GCU;
subjecting the memory to a power cycle event in which supply power is removed and reapplied to the memory;
placing the memory in a restoration mode in which the memory is operationally ready to service read and write commands to transfer data between the memory and a host device;
determining, during the restoration mode, a virtualized staleness count for the GCU responsive to the actual staleness count, a reverse directory table of the GCU and forward pointer data associated with data blocks written to the GCU; and
transitioning the memory from the restoration mode to the normal operational mode in a manner transparent to the host device after the virtualized staleness count is determined.

13. The method of claim 12, in which the reverse directory table lists, in order, data blocks that have been written to the GCU and is updated as each new data block is written in turn.

14. The method of claim 12, in which the forward pointer data links successive addresses in the memory to which data blocks sharing a common logical address have been stored.

15. The method of claim 12, in which the determining step comprises, for each data block listed in the reverse directory table, locating a final entry in the forward pointer data corresponding to the listed data block in the reverse directory table, determining whether the final entry describes an address in the GCU, and incrementing the actual staleness count responsive to the final entry describing an address that is not in the GCU.

16. An apparatus comprising:
a memory arranged into a plurality of garbage collection units (GCUs) each separately allocated and erased as a unit; and
a control circuit adapted to, during a restoration mode after a power cycle event, generate a virtualized staleness count for the GCU responsive to the actual staleness count, a reverse directory table of the GCU and forward pointer data associated with data blocks written to the GCU, the control circuit further adapted to transition the memory from the restoration mode to the normal operational mode after the virtualized staleness count is determined.

17. The apparatus of claim 16, in which the reverse directory table lists, in order, data blocks that have been written to the GCU in turn.

18. The apparatus of claim 16, in which the forward pointer data links successive addresses in the memory to which data blocks sharing a common logical address have been stored.

19. The apparatus of claim 16, in which the control circuit is further adapted to service a write command to write data to the memory after the power cycle event and prior to the transitioning of the memory to the normal operational mode, the control circuit incrementing the actual staleness count for the GCU responsive to the servicing of the write command.

20. The apparatus of claim 16, in which the memory is a flash memory array, and the GCU comprises a plurality of erasure blocks in the array that are allocated, used and subjected to garbage collection as a unit.

* * * * *